140 X

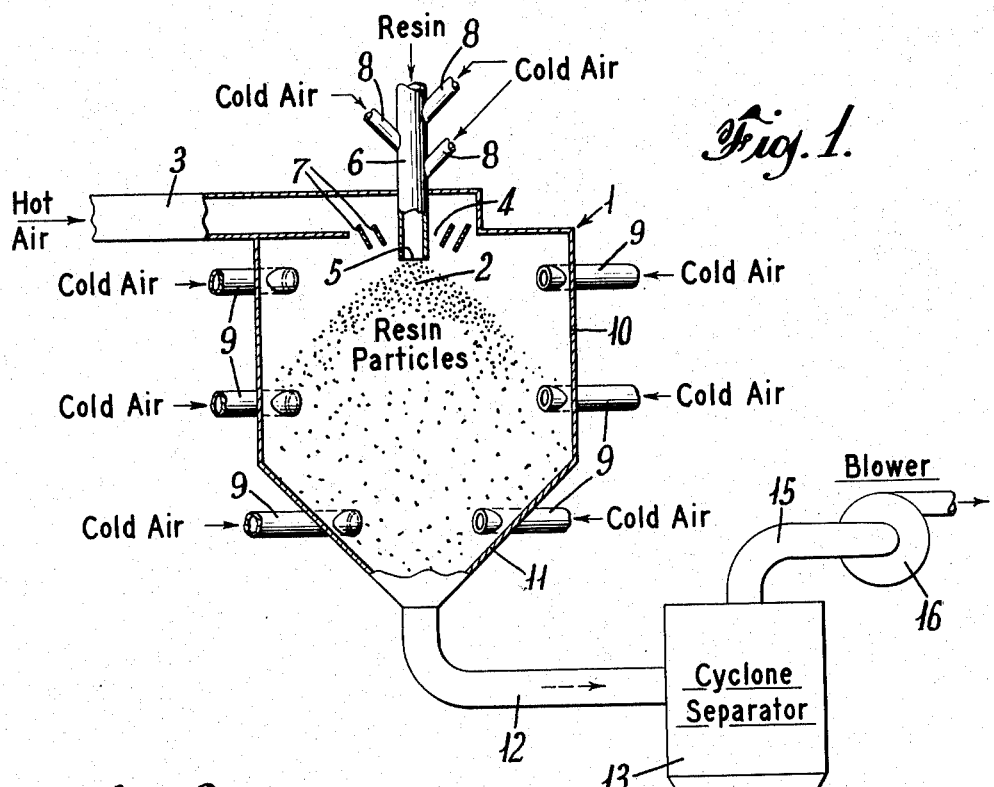
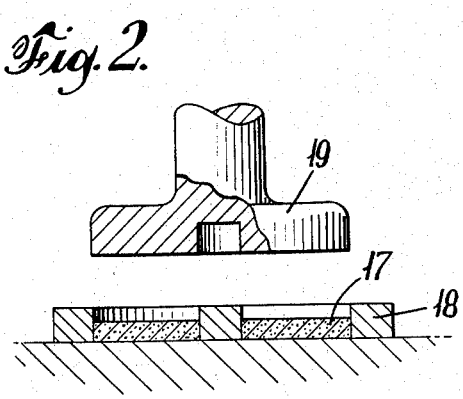
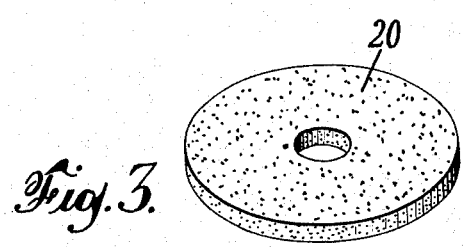
Fig. 1.
Fig. 2.
Fig. 3.
INVENTORS
WILLIAM A. KEUTGEN
RUPERT S. DANIELS
CHARLES R. DAVALL
ROBERT D. NOYES
ATTORNEY

140 X

INVENTORS
WILLIAM A. KEUTGEN
RUPERT S. DANIELS
CHARLES R. DAVALL
ROBERT D. NOYES

BY E. J. Fischer

ATTORNEY

2,901,337

ABRASIVE ARTICLES AND METHOD OF MAKING THE SAME

William A. Keutgen, Martinsville, Charles R. Davall, Somerville, and Rupert S. Daniels, Union, N.J., and Robert D. Noyes, Greenwich, Conn., assignors to Union Carbide Corporation, a corporation of New York Application July 31, 1956, Serial No. 601,139

10 Claims. (Cl. 51—298)

This invention relates to abrasive articles and to a method of making the same. It relates more particularly to a process of producing grinding wheels and discs of bonded granular abrasive material wherein heat-rounded minute spheres of fusible resin are utilized as a bond for the abrasive granules.

These minute spheres made from a fusible phenol aldehyde condensation product and hereinafter referred to as microspheres have proven to be of particular value in the preparation of abrasive wheels of improved performance and greater utility.

Synthetic resin bonded abrasive wheels have been manufactured heretofore by a process wherein the abrasive grit is mixed with a liquid wetting agent such as furfural or a reactive liquid phenol-formaldehyde resin so as to thoroughly coat the grain. The wetted grain is then mixed with dry powdered solid phenol-formaldehyde resin (a potentially reactive resin i.e. one containing the necessary proportion of methylene component e.g. hexamethylene tetramine). The amount of powdered resin added is sufficient to produce a mix of thoroughly coated grains in a loose dry condition, neither sticky nor gummy, and which distributes itself in a uniform manner in the mold. Nevertheless, under pressure in a cold mold, the mix becomes sufficiently tacky to adhere together, such that it holds its shape after removal from the mold and during the subsequent heat hardening step.

A difficulty has been encountered in the use of this process, however, since it necessitates the employment of a long time heating cycle at slowly increasing temperatures to cure the abrasive structures. If this is not done, voids and blisters result from the too rapid volatilization of all or part of the solvent or liquid resin. The curing process is unduly time consuming.

The powdered solid resin commonly used industrially as a bonding agent in abrasive wheels normally ranges in size from 2 to 150 microns in diameter. The individual pulverized resin particles are irregular in shape and the surface area and powder density is dependent on the fineness of grind. A finer grind causes an increase in surface area and a decrease in powder density.

Vitrified wheels, normally operated at or below 6500 surface feet per minute (s.f.p.m.) have been supplanted in many operations by these resin-bonded abrasive operating at 9500 to 16,000 s.f.p.m. The employment of fusible resin in powdered form with its higher strength and resistance to mechanical shock permits safer operation at the higher speeds. However, it has been found that the heat polished or rounded microspheres employed in the abrasive wheels of the present invention allows safe operation at even higher speeds, resulting in even greater improvement in grinding performance and efficiency. Thus, grinding wheels made in accordance with the practice of the present invention have increased resistance to centrifugal forces tending to cause a rotating abrasive wheel to fly apart, a substantial diminution in the tendency to break under shock, and a resistance to fragmentation. High strength, low stretch materials, i.e. glass fibers, while they improve shock and flexural strength do not prevent the article from flying into pieces. Fragmentation resistance is particularly desirable since grinding is frequently done on the lateral surfaces of certain types of wheels, and a wheel having this characteristic will have less tendency to fly to pieces if the lateral forces during grinding should exceed flexural strength. Such increased performance, efficiency and safety is manifested by faster cutting, longer wheel life and, of course, higher stock removal rates.

Not only in the use of the abrasive products of the present invention is the safety factor increased but also in the manufacture of these articles, for the dust explosion hazard is markedly reduced employing phenolic resin microspheres from that present when a pulverized phenolic resin, which has much greater surface area per unit weight, is employed.

In addition, abrasive mixtures containing polished microspheres are more adaptable to continuous automatic operations, as well as undergoing a better bonding with a shorter curing period. This is due to the fact that it is possible, using microspheres, to introduce in the abrasive mix a higher ratio of microspheres to wetting agent than can be employed with standard powdered resin.

According to another heretofore disclosed procedure a liquid mixture of a resinoid and water or a melted resinoid is sprayed into a current of hot air to secure removal of the moisture content and other volatile impurities while in a finely divided condition. By so doing, dehydration of the resinoid is also obtained and while in a finely suspended condition falls freely through a warm air zone to the bottom of the cylinder where it may meet a gentle current of cool air. It is necessary, in order to effect removal of moisture and dehydration to maintain consistently higher temperatures in the warm air zone than would be required in forming spheroids from a dry, powdered resin, thus increasing the incidence of agglomeration and adhesion to the walls of the pelletizing container. Further this process provides neither a deglomerated dry powdered resin entering the warm zone, nor does it teach such a turbulent air flow as would prevent, substantially, the adherence of the resin particles upon the walls of the gas flow chamber wherein the spherical pellets are to be formed.

Still other procedures are taught for producing spherical pellets, although not disclosing resinous materials generally. In the practice of one of these methods, particles of glass, or a similar material, are permitted to fall freely from a container into a flamed, or heated current wherein the particles are entrained, melted and passed into a chamber while cooling and becoming hardened, no turbulent cooling zone being present. According to another of these processes, a free fall may be afforded the particles through a warm and a cold air zone, the warm zone being heated from outside the zone container by a suitable heating device. Neither of these procedures, however, employ turbulent gas zones, as such, nor do they teach a deglomerative introduction of the particles to be formed into spheres into the warm and cold gas zones. The substitution of liquids of lesser specific gravity than the powdered material to be treated, in the warm and cold zones for the gaseous media, has also been suggested. However, the employment of liquid media effects a radical reduction in the degree of turbulence as well as requiring an additional drying step.

Further, as far as is known, none of the pellets formed by these above described methods have hitherto been employed as bonding agents in abrasive grinding wheels.

Broadly, the present invention involves a method of producing grinding wheels by propelling and dispersing dry, ground fusible particles of a heat-hardenable phenol aldehyde resin, preferably by means of a cool, turbulent substantially inert gas feed, such as air, functioning at a temperature substantially below the melting point of the said resin, into a mixing chamber. The resin is introduced into this latter chamber at one end thereof, at which point the said particles are entrained in a hot, turbulent substantially inert gas stream above the melting point of the resin and heat rounded or polished by surface tension. The microspheres so formed usually range in size from approximately 5 to 150 microns in diameter and preferably at least 90 percent of the microspheres vary in diameter from 15 to 200 microns. These spheres pass to the periphery and opposite end of the mixing chamber where a cool, turbulent substantially inert gas of a temperature substantially below the melting point of said resin is supplied to said chamber, entraining and cooling said spheres therein to form fusible, rounded microspheres, and withdrawing said microspheres and said intermixed hot and cool gases through a common port from said mixing chamber. The microspheres are then introduced into a thoroughly blended composition composed of abrasive grain coated with an organic liquid wetting agent such as furfural or a reactive, liquid phenol-formaldehyde resin, and mixed therewith, and subsequently molded into the product grinding wheels employing a "cold press" or "hot press" method.

The terms "phenol-aldehyde condensation product" and "phenol-aldehyde resin" as employed throughout this specification refer to acid or base catalyzed heat-hardenable resins of the resole or novolak type, such as are described in U.S. Patents 2,585,196 to Walton; 2,475,587 to Bender et al.; 2,557,922 to Mazzucchelli et al.; 2,617,785 to Pritchett et al.; 2,675,335 to Rankin et al. and 2,552,025 to Barr et al. These terms are also intended to include heat-hardenable phenol-aldehyde resins modified with up to 20 percent and preferably 10 percent to 20 percent of thermoplastic resins such as polymerized vinyl ethers and vinyl esters, for example, polyvinyl acetate, polyvinyl chloride and copolymers of vinylidene chloride and vinyl chloride, partial acetals of polyvinyl alcohol such as the partial formaldehyde or butyraldehyde acetal of hydrolyzed polyvinyl acetate, and polystyrene and copolymers thereof with other compatible polymerizable compounds. By a heat-hardenable resin is meant a resole resin which is heat-hardenable per se or a novolak resin which becomes so upon the addition of a methylene engendering agent.

Thus if the microspheres are of the novolak type of phenol-aldehyde resin they must be mixed with sufficient methylene containing hardening agent e.g. hexamethylene tetramine, paraformaldehyde or formaldehyde, to render them infusible when heated to the elevated temperatures required for producing various abrasive articles such as grinding discs and wheels, as is known to the art. Alternatively the engendering agent can be added to the particulate resin prior to the formation of the microspheres or upon addition of the modifying resin, in which latter instance, for example, an excess of engendering agent can be introduced into the modifying resin prior to its addition to the phenol-aldehyde resin particles.

Fig. 1 in the drawings is a schematic side elevation of the preferred apparatus set-up suitable for the practice of the invention.

Fig. 2 is a sectional view of a suitable mold which may be employed in the manufacture of the subject grinding wheels, and the abrasive composition to be molded contained therein.

Fig. 3 is a perspective view of a finished wheel.

Figure 4:
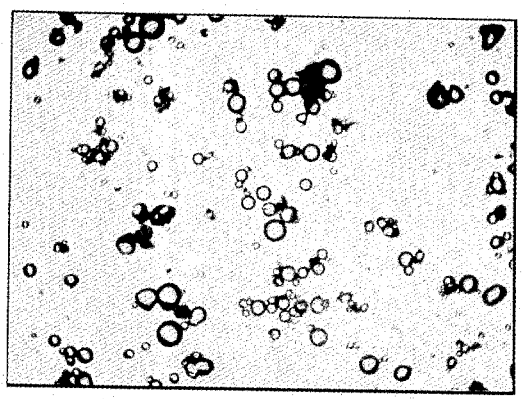
Fig. 4 is a photomicrograph of the resin microspheres obtained by the process of the present invention.

Referring more particularly to the drawings, the apparatus comprises a mixing chamber 1, wherein the resin particles 2 are fused by a hot air stream passed at a temperature ranging from 300° F. to 400° F. or about 100° F. to 300° F. above the fusing point of the resin from a furnace (not shown) and emerging from the hot air conduit 3 the annular opening 4 of which is coaxially disposed about the resin feed port 5 of the resin particle conveyor tube 6 at the top central portion of said mixing chamber 1. Vanes 7 in this annular orifice 4 impart a circular motion to the hot air entering the chamber 1 and produce a turbulent condition just below the said resin feed port 5. The particle conveyor tube 6 also has disposed along its side walls at regular intervals, cold air jets 8 for effecting turbulent deglomeration and propulsion of the ground resin particles by emission of cool air into the resin conveyor tube 6. Sufficient cool air should be introduced such that the temperature is preferably about 20° F. to 30° F. below the fusion point of the resin particles. Thus the temperature of the cool air is generally from 40° F. to 90° F. The pulverized resin may be fed to this conveyor tube 6 from a vibratory trough feeder wherein the resin particles are deposited subsequent to grinding of the resin to the desired particle size, normally 2 to 150 microns in diameter, and prior to their introduction into the aforesaid conveyor tube 6 at a controlled rate of speed. A plurality of compressed air lines 9 are also provided along the periphery of the mixing chamber for the introduction of cool air therein. These air lines 9 are so adjusted that the air entering the chamber 1 does so tangentially to the wall thereof and in counterrotation to the flow of warm air about the resin feed port 5, thus continuing the turbulent pattern of air movement in the mixing chamber. In this manner the fused resin particles formed into microspheres in the hot zone by virtue of surface tension, are maintained in a dispersed phase while congealing in the peripheral and lower cool zone, accomplishing a two-fold purpose by preventing agglomeration as well as adherence of the microspheres to the side walls of the mixing chamber 1. The configuration of this latter chamber may be that of an upright cylinder 10 with a conical bottom section 11 which tapers to form the entrance to conduit 12 by which passage the fusible microspheres are transported to the cyclone separator 13, from the bottom of which product microspheres are withdrawn through the product conveyor tube 14. Disposed externally to said cyclone separator 13, and communicating therewith through air conduit 15, is a blower 16 for the purpose of drawing air through the entire system hereinabove described. After withdrawal from the cyclone separator 13, the phenol-aldehyde resin microspheres are blended with a thoroughly mixed composition containing abrasive grain and a quantity of liquid wetting agent, i.e. furfural, liquid phenol-formaldehyde resin sufficient to coat said grain. The resultant blend 17 is placed in a mandrel or mold 18 as indicated in Fig. 2 where the abrasive mixture 17 is formed under pressure from a punch or press 19 and cold or hot pressed to produce a product wheel 20 as seen in Figure 3. When the "cold press" method is employed the abrasive blend 17 is molded to form the desired wheel or disc under pressure ranging from 1000 to 10,000 pounds per square inch (p.s.i.) and then baked for periods varying from two to twelve hours at temperatures varying between approximately 80° F. to 365° F.

The operative procedures for cold molding are as stated in Example 1 hereinbelow. In the "hot press" method, the wetting or distributing agent is generally creosote oil, either in whole or in part, and the abrasive mix is pressed at 2000 to 6000 p.s.i. at temperatures of 300° F. to 350° F. After removal from the mold, the abrasive structure is given a short after-bake of two to twelve hours at 300° F. to 400° F.

Fig. 4 is a photomicrograph showing the resin microspheres obtained by the herein described process enlarged 140 times. The microspheres depicted are in the range of 5 to 40 microns in diameter.

Figure 5:
Fig. 5 is a photomicrograph of the standard pulverized ground resin particles shown for purposes of comparison.

Fig. 5 shows, for purpose of comparison, the standard pulverized ground resin particles currently employed in the production of abrasive articles, the particles ranging in size from 2 to 65 microns in diameter. The photomicrograph shows these particles enlarged 140 times.

Figure 6:
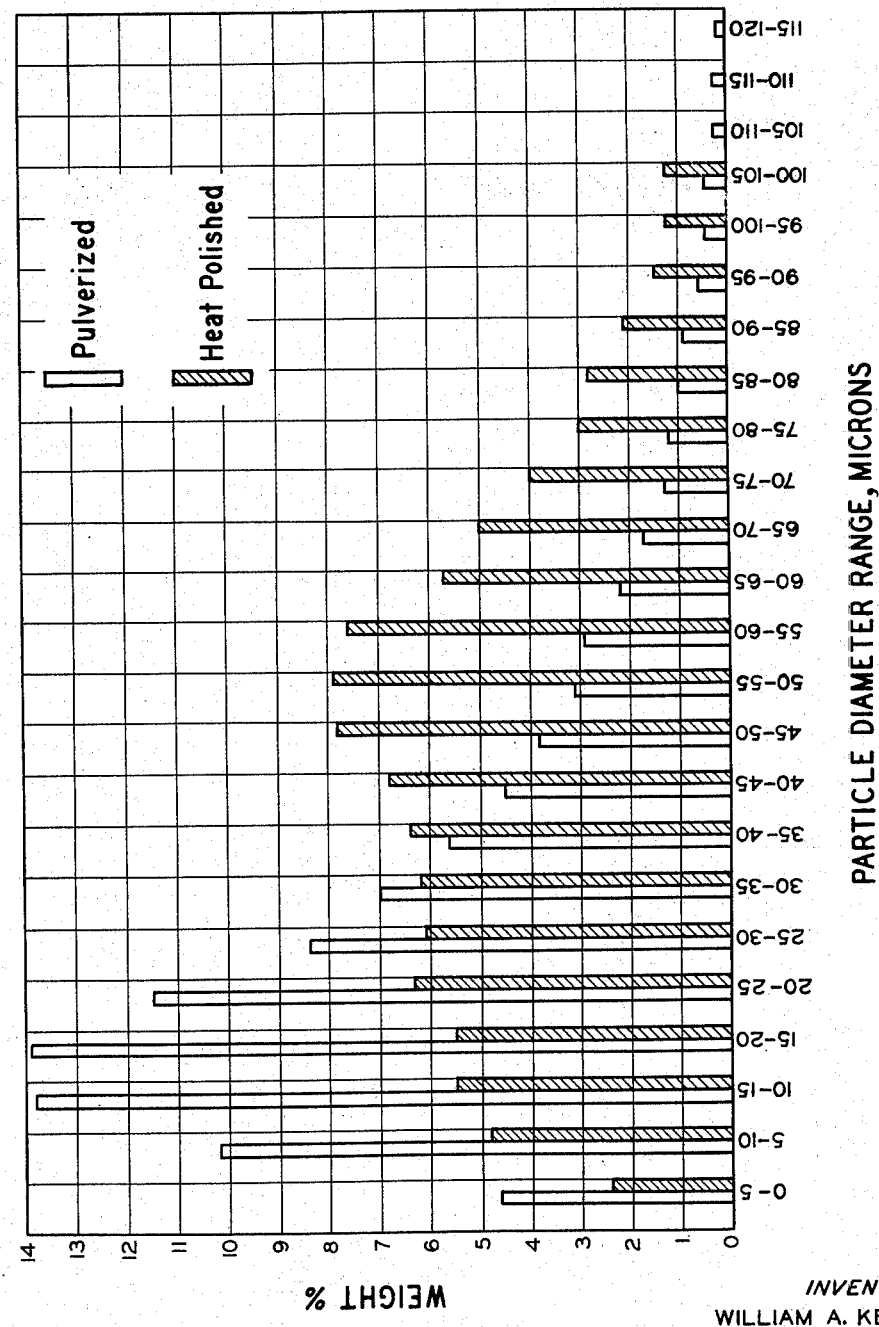
Fig. 6 is a comparison plot of the particle size distribution of the heat-polished resin microspheres employed in preparing the grinding wheels of the present invention with a standard pulverized resin.

Fig. 6 is a graphic representation depicting particle size distribution as indicated by the diameter size thereof, for the heat polished microspheres of this invention as illustrated in Fig. 4 and that of the standard pulverized resin particles such as are shown in Fig. 5. The uniformity in size of the heat polished resin relative to that for the standard pulverized resin hitherto employed is readily evident.

If it is desired to completely cool the processed microspheres before incorporation in the mold they may be picked up in a cold air steam at the bottom of the first cyclone separator and carried to a second cyclone for collection, before their incorporation in an abrasive composition.

Thermocouples are preferably employed to measure the temperature of the hot air stream as it enters the chamber 1 and the temperature of the air stream leaving the said chamber, and drawn therefrom by the blower system described above. In a preferred method of practicing the present invention the volume of cold air entering the chamber through the compressed air lines 9 is equal to the volume of hot air entering the mixing chamber 1 from the furnace.

The invention is illustrated in greater detail in the following examples:

EXAMPLE 1

A mixing chamber and accessory equipment similar to that shown in Fig. 1 and described hereinabove was used. The chamber diameter was 3.8 feet, the height of the cylindrical portion was 3.3 feet and the conical section tapered down to a diameter of 4 inches over a height of 3.3 feet. This chamber was fitted with a 1/4 inch diameter opening in the center of the top through which pulverized resin was fed. The cool air introduced in the resin conveyor tube and in the mixing chamber is maintained at 50°–60° F., and drawn through the system together with the hot air by a blower operating at a capacity of 280 ft. 3/min. at a temperature of 380° F. Cold air was fed into the chamber through the compressed air line at a rate sufficient to reduce the outlet air to a temperature of 170° F., a point just below the melting point of the resin. Under these conditions the volume of cold air entering the chamber through the compressed air line and the resin conveyor tube was equal to the volume of hot air entering the chamber from the furnace. With the temperatures stabilized, pulverized resin was fed to the chamber at the rate of 50 grams/min. A typical screen analysis for the pulverized feed resin was 0 percent retained on 40 mesh, 1 percent retained on 100 mesh, 3 percent retained on 200 mesh and 15 percent retained on 325 mesh, the remainder passing through.

The mesh sizes referred to throughout this specification accord with the accepted standards in this regard and are as follows:

| U.S. Sieve Sizes—Sieve No. (Mesh) | Diameter of Sieve Opening in Microns |
|---|---|
| 20 | 840 |
| 30 | 590 |
| 40 | 420 |
| 50 | 297 |
| 60 | 250 |
| 70 | 210 |
| 80 | 177 |
| 100 | 149 |
| 120 | 125 |
| 140 | 105 |
| 170 | 88 |
| 200 | 74 |
| 230 | 62 |
| 270 | 53 |
| 325 | 44 |

Coarse grain abrasive structures were prepared using 88 parts of an equal mixture of No. 12, No. 14 and No. 16 aluminum oxide abrasive grain (grain sizes are those employed in U.S. Department of Commerce Bulletin 118–50, Table I). The abrasive grain was first mixed with a quantity of liquid phenol-formaldehyde resin. A typical liquid phenol-formaldehyde resin is one prepared from equal molar quantites of phenol and paraform and reacted with an alkaline catalyst such as sodium hydroxide to a viscosity of approximately 300–400 cps. After thorough mixing, the resin wetted grains were mixed with a quantity of phenol-formaldehyde novolak resin in the form of microspheres prepared as described above containing about 9 percent by weight of hexamethylene tetramine. The abrasive mixtures were then cold molded into abrasive bars under a pressure of 1000–10,000 p.s.i., the proportions of liquid wetting agent and microspheres varying for the several test bars as indicated in Table I. The bars were then baked according to the following representative schedule.

Temperature:
```
80° F. to 175° F_____minutes__ 20
175° F. to 195° F_____hours__  2
At 195° F_____do____ 12
195° F. to 215° F_____do____  2
At 215° F_____do____  3
215° F. to 245° F_____do____  3
At 245° F_____do____  3
245° F. to 285° F_____do____  4
At 285° F_____do____  2
285° F. to 365° F_____do____  8
At 365° F_____do____  9
```

These bars, when tested for tensile strength, gave the results recorded in Table I. For comparison, test bars were prepared using a quantity of the same liquid phenol formaldehyde resin and the same powdered novolak resin which was used in preparing the resin microspheres.

*Table I*

| Sample No. | Percent Liquid Resin | Percent Powdered Resin | Percent Microspheres | Tensile Strength, lbs./sq. in. at 25° C. |
|---|---|---|---|---|
| 1 | 2.6 | 9.4 |  | 1,171 |
| 2 | 2.6 |  | 9.4 | 1,658 |
| 3 | 2.0 |  | 10.0 | 1,604 |
| 4 | 1.3 |  | 10.7 | 1,628 |

It is evident from this table that using the standard amounts of liquid resin in combination with resin microspheres, abrasive structures of superior strength were obtained. These values also hold when using only 50 percent of the amount of liquid resin disclosed in Table I above. This increased strength is indicative of a structure having less internal voids and blisters than structures prepared with powdered resin.

The particular phenol-aldehyde resin used in the above described example was a novolak resin prepared as follows:

A mixture of 100 parts of phenol and 72 parts of aqueous formaldehyde (37 percent) was heated to 55° C. and sufficient oxalic acid added to give a pH of 0.05–1.15. The mixture is reacted under vacuum reflux at 80° C. until it is cloudy. The temperature is then increased to 120° C. and the reaction continued under pressure of about 15 lbs. for about two hours. The reaction mixture is then dehydrated at atmospheric pressure to a residue temperature of 160° C. and then under reduced pressure until a sample of the resin has a melting point of about 95°–105° C.

The physical properties of the novolak microspheres compared to the novolak resin used in their preparation are as follows:

|  | Microspheres | Novolak Resin |
|---|---|---|
| Plate Flow mm.[1] | 35 | 33 |
| Gel at 150° C. in seconds [1] | 81 | 81 |
| Screen analysis: |  |  |
| Percent on 40 mesh | 0 | 0 |
| Percent on 100 mesh | 0.13 | 1.0 |
| Percent on 200 mesh | 5.3 | 3.0 |
| Bulk Density, g./°C | 0.59 | 0.39 |
| Surface Area, sq. meters/gm | 0.2 | 0.7 |

[1] Both microspheres and resins were blended with 10 percent by weight hexamethylene tetramine to measure these properties.

EXAMPLE 2

A resole resin was heat polished according to the process and employing the apparatus described in Example 1 above, except that the temperature at the exit from the mixing chamber was maintained at 180° F.

The resulting microspheres were incorporated with a blend of abrasive grain and liquid phenol formaldehyde resin according to the process of Example 1. A portion of the abrasive mixture was then placed in a mold and hot pressed to form the product grinding wheels. In this method the abrasive mixture is heat molded at a temperature of 300° F., then given a short after bake, of 8 hours at 350° F. An abrasive blend of resole resin microspheres and abrasive grains coated with liquid phenol formaldehyde resin were also cold-molded in accordance with the practice of Example 1.

The abrasive bars obtained by the cold press method when tested for tensile strength gave the results recorded in Table II. For comparison, test bars were prepared using a quantity of the same liquid phenol-formaldehyde resin and a quantity of the same pulverized resole resin used in preparing the resin microspheres. The proportions of resin solvent and resin microspheres as well as the proportionate amount of pulverized resin employed in the test bars is disclosed in Table II.

Table II

| Sample No. | Percent Liquid Resin | Percent Pulverized Resin | Percent Microspheres | Tensile Strength, lbs./sq. in. at 25° C. |
|---|---|---|---|---|
| 1 | 2.67 | 9.33 |  | 866 |
| 2 | 1.33 |  | 10.67 | 1,390 |

It is apparent from this table that, as when a novolak resin was employed in Example 1, using suitable amounts of liquid resin in combination with resin microspheres, abrasive structures of superior strength are obtained. and these values are obtained using only 50 percent of the amount of liquid resin required for the test bars prepared with pulverized resin.

The particular resole resin employed was prepared by reacting 100 parts phenol, 90.4 parts aqueous formaldehyde (37 percent) and 5.6 parts hexamethylene tetramine under reduced pressure (17" vacuum) at a temperature of 70° to 80° C. for about one hour. The reaction mixture is then dehydrated under reduced pressure (26–26.5" vacuum) to a residue temperature of 75° C. The resulting product is a brittle grindable resin.

The physical properties of resolue microspheres compared to the pulverized resole resin used in their preparation are as follows:

|  | Microspheres | Resole Resin |
|---|---|---|
| Contraction Point, ° C | 85 | 84 |
| Gel Time at 150° C., Sec | 41 | 43 |
| Screen analysis: |  |  |
| Percent on 100 mesh | 28.40 | 29.23 |
| Percent on 200 mesh | 57.64 | 55.58 |

The time/temperature treatment to which the resin is subjected in this process does not cause any appreciable advancement of a heat reactive material since the resin is only subjected to a temperature slightly above its melting point for a maximum of 5 to 7 sec. The rate at which resin can be processed is naturally dependent on the size of the equipment which is used, and the rate of air flow through it.

EXAMPLE 3

(a) A phenol-aldehyde resin of the "novolak" type was prepared according to the disclosure in U.S. Patent 2,371,915 as follows:

A still fitted with a reflux condenser and an agitator, was charged with 100 parts by weight of phenol, 70 parts by weight of 37.5 percent by weight aqueous formaldehyde and 0.5 part by weight of phosphoric acid. This mixture was heated to boiling whereupon an exothermic resin reaction begins. After the initial fogging of the reaction material, which indicates separation of the resin within the mass, additional heat was then supplied to maintain a gentle boil for four or five hours. Then 95 parts by weight of gelatinous hydrous oxide mixture, e.g. a mixture containing about 40 percent iron oxide and 50 percent chrome oxide and 10 percent aluminum oxide containing about 25 percent solids (solids determined by heating three hours at 135° C. under atmospheric pressure) were added and stirred into the resin. After mixing, the mass was dehydrated and the product obtained was hard and brittle at room temperature and had a softening point of about 100° C. The resulting resin was pulverized and then heat polished as described in Example 1. The resin microspheres were then blended with 9 percent by weight of hexamethylene tetramine.

(b) A phenol-formaldehyde resin was prepared according to the directions given in Example 1. One hundred parts of this resin were mixed with 10 parts of polyvinyl butyral resin by fluxing them together on differential rolls heated to about 140°–160° F. After a smooth sheet had been obtained, which required about 6 minutes rolling time, 9 parts of hexamethylene tetramine were added and the mixture compounded an additional two minutes. The resulting composition comprising 100 parts phenol formaldehyde resin, 10 parts polyvinyl butyral resin and 9 parts hexamethylene tetramine was removed from the rolls and cooled to room temperature (25° C.) It was then pulverized and heat polished as described in Example 1.

The physical properties of the heat polished resins of (a) and (b) were substantially the same as those of the pulverized resin.

The resin microsphere compositions of (a) and (b) were then used to prepare a series of abrasive mixtures which were molded in test bars after the manner described in Example 1. The abrasive mixtures were made using 830 parts of an equal mixture of 12, 14 and 16 size aluminum oxide grain and 60 parts sodium aluminum fluoride for every 110 parts by weight of resin bond. The test bars gave the results listed in Table III, in comparison with similar abrasive test bars molded from comparable pulverized resin.

*Table III*

| Abrasive Mix | Resin | Parts by Weight | | | | Flexural Strength, p.s.i. | |
|---|---|---|---|---|---|---|---|
| | | Wetting Agent, 60/40 Mix | | Microspheres | Pulverized Resin | | |
| | | Liquid Resin | Furfural Cresol | | | 25° C. | 260° C. |
| 1 | 3a | -------- | 30 | -------- | 110 | 3,580 | 877 |
| 2 | 3a | -------- | 22 | 110 | -------- | 3,230 | 1,270 |
| 3 | 3a | 30 | -------- | -------- | 80 | 3,020 | 1,800 |
| 4 | 3a | 15 | -------- | 95 | -------- | 4,970 | 1,980 |
| 5 | 3b | -------- | 40 | -------- | 110 | 7,030 | 211 |
| 6 | 3b | -------- | 30 | 110 | -------- | 6,780 | 282 |
| 7 | 3b | 39 | -------- | -------- | 71 | 6,200 | 535 |
| 8 | 3b | 30 | -------- | 80 | -------- | 6,770 | 620 |

It will be noted from this table that the abrasive bars made with microspheres had either substantially equal or superior flexural strength at room temperature and superior strength at high temperatures when compared to the strengths obtained on the test bars in which the comparable pulverized resin was employed. This is due in part to the fact that lesser amounts of wetting agent were required in the abrasive mixes made with the microspheres.

That lesser amounts of wetting agents can be employed with the resin microspheres to obtain easy flowing mixes from which the solid resin does not separate, is illustrated also by the following experiment.

An abrasive mix was prepared using the following formulation:

830 gms. of an equal mixture of No. 12, 14 and 16 aluminum oxide abrasive grain[1]
60 gms. sodium aluminum fluoride ($3NaF \cdot AlF_3$)
18 gms. liquid phenol-formaldehyde resin
92 gms. resin microspheres 1000 Total

[1] See Table I, U.S. Department of Commerce Bulletin 118-50.

The resultant mix was placed in a 60 mesh screen and vibrated for three minutes. The residue left on the screen weighed 991 grams or there was a loss of 9 grams.

The above experiment was repeated, but substituting a standard ground pulverized resin for the microspheres. The residue left on the screen weighed 925 grams or a loss of 75 grams, more than 8 times that accruing when the microspheres were used.

It will be apparent to those skilled in the art that while we have disclosed the preferred embodiments of our invention and the preferred modes of carrying the same into effect, that many variations may be made therein without departing from the spirit thereof. Thus, for example, pulverized resin as coarse as 15 percent on 100 mesh, 40 percent on 200 mesh and 60 percent on 325 mesh had been processed, but a larger chamber is preferable for such a material in order to completely melt the larger resin particles. Accordingly, the scope of this invention is not limited to the specific embodiments thereof except as defined in the appended claims.

We claim:

1. A composition for making abrasive articles consisting essentially of abrasive grains coated with an organic liquid wetting agent and dispersed throughout as a heat hardenable binder for said grains, fusible heat-polished solid microspheres of a ground heat-hardenable phenol aldehyde resin, said microspheres having a size of about 5 to 150 microns in diameter and having a higher bulk density than the ground fusible particles of said resin before heat polishing into microspheres.

2. A composition according to claim 1 wherein the organic liquid wetting agent is a liquid phenol-formaldehyde resin.

3. A composition according to claim 1 wherein the organic liquid wetting agent is furfural.

4. A composition according to claim 1 wherein the weight proportion of abrasive grains to resin microspheres is about 9 to 1.

5. A process for making abrasive articles from abrasive grains bonded with a heat hardened phenol aldehyde resin comprising coating said abrasive grains with an organic liquid wetting agent and mixing said coated grains with fusible, heat-polished solid microspheres of a ground heat-hardenable phenol aldehyde resin, said microspheres having a particle size of about 5 to 150 microns in diameter and having a higher bulk density than the ground fusible particles of said resin before heat polishing into microspheres, forming an uncured abrasive article under pressure between about 1000 to 10,000 p.s.i. and thereafter heat curing the said abrasive article at elevated temperatures sufficient to heat harden the phenol aldehyde resin.

6. A process according to claim 5 wherein the organic liquid wetting agent is a liquid phenol formaldehyde resin.

7. A process according to claim 5 wherein the organic liquid wetting agent is furfural.

8. A process according to claim 5 wherein the weight proportion of abrasive grains to resin microspheres is about 9 to 1.

9. A heat molding process for making abrasive articles from abrasive grains bonded with a heat-hardened phenol aldehyde resin comprising coating said abrasive grains with an organic liquid wetting agent and mixing about nine parts by weight of said coated grains with about one part by weight of fusible, heat-polished solid microspheres of a ground heat hardenable phenol aldehyde resin, said microspheres having a particle size of about 5 to 150 microns in diameter and having a higher bulk density than the ground fusible particles of said resin before heat polishing into microspheres, forming an uncured abrasive article from the mixture at pressures between about 2000 to 6000 p.s.i. while at a temperature between about 300° F. and 350° F. and thereafter heating said abrasive article at a temperature between 300° F. and 400° F. for a period of 2 to 12 hours to heat harden the phenol aldehyde resin.

10. A cold molding process for making abrasive articles from abrasive grains bonded with a heat-hardened phenol aldehyde resin comprising coating said abrasive grains with an organic liquid wetting agent and mixing about nine parts by weight of said coated grains with about one part by weight of fusible, heat-polished solid microspheres of a ground heat hardenable phenol aldehyde resin, said microspheres having a particle size of about 5 to 150 microns in diameter and having a higher bulk density than the ground fusible particles of said resin before heat polishing into microspheres, forming an uncured abrasive article from the mixture at pressure between about 1000 to 10,000 p.s.i. and thereafter gradually heating said abrasive article to an elevated temperature of about 365° F. for two to twelve hours to heat harden the phenol aldehyde resin.

References Cited in the file of this patent

UNITED STATES PATENTS

| | | |
|---|---|---|
| 2,101,635 | Bender | Dec. 7, 1937 |
| 2,734,813 | Zalud | Feb. 14, 1956 |
| 2,806,772 | Robie | Sept. 17, 1957 |